US012807543B2

(12) United States Patent
Jackson, III et al.

(10) Patent No.: US 12,807,543 B2
(45) Date of Patent: Nov. 24, 2026

(54) METHODS FOR FABRICATING MULTILAYER ENVIRONMENTAL BARRIER COATINGS

(71) Applicant: RTX Corporation, Farmington, CT (US)

(72) Inventors: Richard Wesley Jackson, III, Mystic, CT (US); Zachary Kennedy, Hamden, CT (US); Olivier H. Sudre, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/920,784

(22) Filed: Oct. 18, 2024

(65) Prior Publication Data

US 2026/0109655 A1 Apr. 23, 2026

(51) Int. Cl.

| | |
|---|---|
| ***C04B 41/52*** | (2006.01) |
| ***C04B 41/00*** | (2006.01) |
| ***C04B 41/45*** | (2006.01) |
| ***C04B 41/50*** | (2006.01) |
| ***F01D 25/00*** | (2006.01) |

(52) U.S. Cl.

CPC .......... *C04B 41/52* (2013.01); *C04B 41/0072* (2013.01); *C04B 41/009* (2013.01); *C04B 41/4582* (2013.01); *C04B 41/5044* (2013.01); *F01D 25/005* (2013.01); *F05D 2220/32* (2013.01); *F05D 2230/90* (2013.01); *F05D 2300/611* (2013.01)

(58) Field of Classification Search

CPC ... C04B 41/52; C04B 41/0072; C04B 41/009; C04B 41/4582; C04B 41/5044; F01D 25/005; F05D 2220/32; F05D 2230/90; F05D 2230/611

See application file for complete search history.

(56) References Cited

U.S. PATENT DOCUMENTS

| | | | |
|---|---|---|---|
| 8,445,822 | B2 | 5/2013 | Sunne |
| 9,598,777 | B2 | 3/2017 | Lee et al. |

(Continued)

FOREIGN PATENT DOCUMENTS

| | | | | |
|---|---|---|---|---|
| CN | 116103599 A | 5/2023 | | |
| EP | 1484427 A2 * | 12/2004 | .......... | C23C 28/345 |

(Continued)

OTHER PUBLICATIONS

"Environmental Barrier Coatings for Ceramic Matrix Composites," publication Lew-Tops-136 from the NASA Technology Transfer Program, Jan. 25, 2022. Retrieved from https://web.archive.org/web/20220125070228/https://technology.nasa.gov/patent/lew-tops-136 on Oct. 3, 2025. (Year: 2022).*

(Continued)

*Primary Examiner* — William P Fletcher, III

(74) *Attorney, Agent, or Firm* — Ross J. Christie; Millen, White, Zelano & Branigan, P.C.

(57) ABSTRACT

A method of forming a multilayer environmental barrier coating, comprising: providing a ceramic matrix composite; depositing a bond coat layer on the ceramic matrix composite; depositing a top coat layer on the bond coat layer; depositing an over coat layer on the top coat layer, wherein the over coat layer includes no more than approximately 50 percent by volume of porosity.

11 Claims, 6 Drawing Sheets

(56) References Cited

U.S. PATENT DOCUMENTS

| | | | | |
|---|---|---|---|---|
| 10,717,678 | B2 * | 7/2020 | Lee | C23C 28/36 |
| 11,325,869 | B1 * | 5/2022 | Lee | C04B 41/52 |
| 11,608,749 | B2 * | 3/2023 | Jackson | F01D 5/284 |
| 11,732,353 | B2 | 8/2023 | Chatterjee et al. | |
| 11,827,986 | B2 | 11/2023 | Landwehr et al. | |
| 2009/0324989 | A1 * | 12/2009 | Witz | C23C 4/10<br>204/192.15 |
| 2010/0158680 | A1 | 6/2010 | Fu et al. | |
| 2010/0159150 | A1 | 6/2010 | Fu et al. | |
| 2010/0255289 | A1 * | 10/2010 | Lewinsohn | C04B 41/52<br>524/588 |
| 2012/0099968 | A1 | 4/2012 | Strock et al. | |
| 2013/0122259 | A1 * | 5/2013 | Lee | C23C 28/048<br>428/164 |
| 2016/0084168 | A1 | 3/2016 | Amini et al. | |
| 2016/0108510 | A1 * | 4/2016 | Kirby | C23C 4/02<br>501/133 |
| 2016/0168684 | A1 * | 6/2016 | Brosnan | B05D 5/00<br>427/337 |
| 2016/0333717 | A1 | 11/2016 | Strock | |
| 2019/0092701 | A1 | 3/2019 | Gong et al. | |
| 2019/0120075 | A1 | 4/2019 | Strock | |
| 2021/0180173 | A1 | 6/2021 | Szyndelman et al. | |
| 2021/0188721 | A1 * | 6/2021 | Shi | F01D 5/284 |
| 2022/0371967 | A1 | 11/2022 | Li et al. | |
| 2023/0160311 | A1 * | 5/2023 | Tang | C04B 41/89<br>427/180 |
| 2023/0220580 | A1 * | 7/2023 | Kirby | C23C 18/165<br>204/509 |
| 2024/0425454 | A1 * | 12/2024 | Dane | A61K 39/39 |

FOREIGN PATENT DOCUMENTS

| | | | | |
|---|---|---|---|---|
| EP | 2138477 | A2 | 12/2009 | |
| FR | 3128709 | A1 * | 5/2023 | C04B 41/4531 |
| WO | 2023250172 | A1 | 12/2023 | |

OTHER PUBLICATIONS

ThermaCote: 14 Types of Thermal Barrier Coatings, Oct. 4, 2023. Retrieved from https://web.archive.org/web/20231004233813/ https://thermacote.com/14-types-of-thermal-barrier-coatings/ on Oct. 3, 2025. (Year: 2023).*

European Search Report dated Mar. 13, 2026 issued in corresponding application 25208988.3.

* cited by examiner

METHODS FOR FABRICATING MULTILAYER ENVIRONMENTAL BARRIER COATINGS

FIELD OF THE INVENTION

The subject matter disclosed herein relates to environmental barrier coatings and, in particular, to a multilayer environmental barrier coating.

BACKGROUND OF THE INVENTION

Environmental barrier coatings ("EBC") can increase the durability of hot-section gas turbine engine components of a gas turbine engine. One degradation mode of an EBC is steam-mediated recession where water vapor reacts with silica containing phases to form gaseous silicon hydroxide species. When the EBC recesses, a porous silica denuded phase reaction product forms. For instance, $SiO_2$ containing materials, e.g., a $HfSiO_4$ EBC or an $Yb_2Si_2O_7$ EBC, react with the water vapor ($H_2O$) to form $Si(OH)_4$ vapor species. The reaction front now occurs when the water vapor diffuses through the porous layer disposed between the substrate and EBC, and reacts with the EBC. Initially, the flux is controlled by the thickness of the boundary that the $Si(OH)_4$ has to diffuse through. The boundary layer thickness scales with the gas velocity, that is, higher velocity, faster mass loss. At a certain thickness, water vapor diffusion through the porous layer influences the rate of reaction with the EBC and effectually becomes rate controlling. The loss of material scales with the partial pressure, i.e., concentration, of $Si(OH)_4$ and the rate of diffusion away from the surface of the gas turbine engine component.

SUMMARY OF THE INVENTION

The present disclosure is directed, in a first aspect, to a method of forming a multilayer environmental barrier coating, comprising: providing a ceramic matrix composite; depositing a bond coat layer on the ceramic matrix composite; depositing a top coat layer on the bond coat layer; depositing an over coat layer on the top coat layer, wherein the over coat layer includes no more than approximately 50 percent by volume of porosity.

In another embodiment, the present disclosure is directed to a gas turbine engine component, comprising: a ceramic matrix composite substrate having a multilayer environmental barrier coating deposited within and thereupon, the multilayer environmental barrier coating comprises: a bond coat; a top coat adjacent the bond coat and opposite the ceramic matrix composite substrate; an over coat adjacent the top coat and opposite the bond coat, the overcoat includes no more than approximately 50 percent by volume of porosity.

In yet another embodiment, the present disclosure is directed to a gas turbine engine, comprising: at least one gas turbine engine component including a ceramic matrix composite substrate having a multilayer environmental barrier coating deposited within and thereupon, the multilayer environmental barrier coating comprises: a bond coat;

a top coat adjacent the bond coat and opposite the ceramic matrix composite substrate; an over coat adjacent the top coat and opposite the bond coat, the overcoat includes no more than 50 percent by volume of porosity.

In further embodiments of the present disclosure, including further embodiments of the above exemplary embodiments, depositing the over coat layer includes the steps of: providing a slurry comprising one or more of the following particles: $HfO_2$, fully stabilized $HfO_2$, fully stabilized zirconia, $TiO_2$, $HfTiO_4$, $Al_2TiO_5$, rare earth monosilicates, mullite, and combinations thereof; depositing the slurry on the top coat layer to form the over coat layer; heat treating the bond coat layer, the top coat layer and the over coat layer to form at least one pore on a surface of the over coat layer and create at least one porous surface of the over coat layer; and depositing on the at least one porous surface of the over coat layer a coating comprising one or more of the following coating materials: aluminum oxide, rare earth silicates, mullite, and combinations thereof, wherein depositing the coating comprises at least one of the following deposition methods: atomic layer deposition, chemical vapor deposition, sol-gel, slurry, and combinations thereof.

In further embodiments of the present disclosure, including further embodiments of the above exemplary embodiments, the coating includes a thickness of approximately 10 nm to approximately 1000 nm.

In further embodiments of the present disclosure, including further embodiments of the above exemplary embodiments, the heat treatment step further comprises heating the bond coat layer, the top coat layer and the over coat layer at a temperature of approximately 500° C. to approximately 1,600° C. for a time period of approximately 10 minutes to approximately 24 hours.

In further embodiments of the present disclosure, including further embodiments of the above exemplary embodiments, depositing the over coat layer includes the steps of: providing at least one of the following particles: $HfO_2$, fully stabilized $HfO_2$, fully stabilized zirconia, $TiO_2$, $HfTiO_4$, $Al_2TiO_5$, rare earth monosilicates, mullite, and combinations thereof; depositing on an exterior surface on the at least one hafnium oxide particle a coating comprising one or more of the following coating materials: aluminum oxide, rare earth silicates, mullite, and combinations thereof, to form at least one coated particle; providing a slurry comprising the at least one coated particle; depositing the slurry on the top coat layer to form the over coat layer; and heat treating the bond coat layer, the top coat layer and the over coat layer to form at least one pore on a surface of the over coat layer and create at least one porous surface of the over coat layer, wherein depositing the coating comprises at least one of the following deposition methods: atomic layer deposition, chemical vapor deposition, sol-gel, slurry, and combinations thereof.

In further embodiments of the present disclosure, including further embodiments of the above exemplary embodiments, the heat treatment step further comprises heating the bond coat layer, the top coat layer and the over coat layer at a temperature of approximately 500° C. to approximately 1,600° C. for a time period of approximately 10 minutes to approximately 24 hours.

In further embodiments of the present disclosure, including further embodiments of the above exemplary embodiments, the coating includes a thickness of approximately 2 nm to approximately 50 nm.

In further embodiments of the present disclosure, including further embodiments of the above exemplary embodiments, depositing the over coat layer includes the steps of: providing a slurry comprising at least one of following first particles: $HfO_2$, fully stabilized $HfO_2$, fully stabilized zirconia, $TiO_2$, $HfTiO_4$, $Al_2TiO_5$, rare earth monosilicates, mullite, and combinations thereof; and at least one of the following second particles: aluminum oxide, rare earth silicates, mullite, and combinations thereof; depositing the slurry on the top coat layer to form the over coat layer; and heat treating the bond coat layer, the top coat layer and the over coat layer to form at least one pore on a surface of the over coat layer and create at least one porous surface of the over coat layer.

In further embodiments of the present disclosure, including further embodiments of the above exemplary embodiments, the heat treatment step further comprises heating the bond coat layer, the top coat layer and the over coat layer at a temperature of approximately 500° C. to approximately 1,600° C. for a time period of approximately 10 minutes to approximately 24 hours.

In further embodiments of the present disclosure, including further embodiments of the above exemplary embodiments, the over coat layer includes a thickness of approximately 0.5 mil to approximately 5 mil.

In further embodiments of the present disclosure, including further embodiments of the above exemplary embodiments, the over coat layer includes approximately 20 percent by volume to approximately 30 percent by volume of porosity.

In further embodiments of the present disclosure, including further embodiments of the above exemplary embodiments, the over coat comprises: a first layer including one or more of the following particles: $HfO_2$, fully stabilized $HfO_2$, fully stabilized zirconia, $TiO_2$, $HfTiO_4$, $Al_2TiO_5$, rare earth monosilicates, mullite, and combinations thereof; and, a second layer disposed on the first layer, the second layer includes one or more of the following coating materials: aluminum oxide, rare earth silicates, mullite, and combinations thereof.

In further embodiments of the present disclosure, including further embodiments of the above exemplary embodiments, the first layer includes a thickness of approximately 0.5 mil to approximately 5 mil, and the second layer includes a thickness of approximately 10 nm to approximately 1000 nm.

In further embodiments of the present disclosure, including further embodiments of the above exemplary embodiments, the over coat comprises at least one first particle including one or more of the following: $HfO_2$, fully stabilized $HfO_2$, fully stabilized zirconia, $TiO_2$, $HfTiO_4$, $Al_2TiO_5$, rare earth monosilicates, mullite, and combinations thereof; and, at least one second particle including one or more of the following: aluminum oxide, rare earth silicates, mullite, and combinations thereof.

In further embodiments of the present disclosure, including further embodiments of the above exemplary embodiments, the over coat comprises at least one particle including one or more of the following: $HfO_2$, fully stabilized $HfO_2$, fully stabilized zirconia, $TiO_2$, $HfTiO_4$, $Al_2TiO_5$, rare earth monosilicates, mullite, and combinations thereof; and, at least one coating material disposed on the at least one first particle, the at least one coating material including one or more of the following: aluminum oxide, rare earth silicates, mullite, and combinations thereof.

In further embodiments of the present disclosure, including further embodiments of the above exemplary embodiments, the over coat includes a thickness of approximately 0.5 mil to approximately 5 mil.

In further embodiments of the present disclosure, including further embodiments of the above exemplary embodiments, the top coat comprises one or more of the following: aluminum oxide, rare earth silicates, mullite, and combinations thereof; and, includes a thickness of approximately 1 mil to approximately 10 mil.

In further embodiments of the present disclosure, including further embodiments of the above exemplary embodiments, the bond coat comprises one or more of the following: a matrix including at least one of hafnium silicate and silicon oxide; silicon carbide; and, an alkaline earth alumino-silicate additive; and, includes a thickness of approximately 50 μm to 500 μm.

In further embodiments of the present disclosure, including further embodiments of the above exemplary embodiments, the overcoat includes approximately 20 percent by volume to approximately 30 percent by volume of porosity.

In further embodiments of the present disclosure, including further embodiments of the above exemplary embodiments, the over coat comprises: a first layer including one or more of the following particles: $HfO_2$, fully stabilized $HfO_2$, fully stabilized zirconia, $TiO_2$, $HfTiO_4$, $Al_2TiO_5$, rare earth monosilicates, mullite, and combinations thereof; and, a second layer disposed on the first layer, the second layer includes one or more of the following coating materials: aluminum oxide, rare earth silicates, mullite, and combinations thereof.

In further embodiments of the present disclosure, including further embodiments of the above exemplary embodiments, the first layer of hafnium oxide includes a thickness of approximately 0.5 mil to approximately 5 mil, and the second layer of aluminum oxide includes a thickness of approximately 10 nm to approximately 1000 nm.

In further embodiments of the present disclosure, including further embodiments of the above exemplary embodiments, the over coat comprises at least one first particle including one or more of the following: $HfO_2$, fully stabilized $HfO_2$, fully stabilized zirconia, $TiO_2$, $HfTiO_4$, $Al_2TiO_5$, rare earth monosilicates, mullite, and combinations thereof; and, at least one second particle including one or more of the following: aluminum oxide, rare earth silicates, mullite, and combinations thereof.

In further embodiments of the present disclosure, including further embodiments of the above exemplary embodiments, the over coat comprises at least one particle including one or more of the following: $HfO_2$, fully stabilized $HfO_2$, fully stabilized zirconia, $TiO_2$, $HfTiO_4$, $Al_2TiO_5$, rare earth monosilicates, mullite, and combinations thereof; and, at least one coating material disposed on the at least one first particle, the at least one coating material including one or more of the following: aluminum oxide, rare earth silicates, mullite, and combinations thereof.

In further embodiments of the present disclosure, including further embodiments of the above exemplary embodiments, the over coat includes a thickness of approximately 0.5 mil to approximately 5 mil.

In further embodiments of the present disclosure, including further embodiments of the above exemplary embodiments, the top coat comprises one or more of the following: aluminum oxide, rare earth silicates, mullite, and combinations thereof; and, includes a thickness of approximately 1 mil to approximately 10 mil.

In further embodiments of the present disclosure, including further embodiments of the above exemplary embodiments, the bond coat comprises one or more of the following: a matrix including at least one of hafnium silicate and silicon oxide; silicon carbide; and, an alkaline earth-alumino-silicate additive; and, includes a thickness of approximately 50 μm to 500 μm.

In further embodiments of the present disclosure, including further embodiments of the above exemplary embodiments, the overcoat includes approximately 20 percent by volume to approximately 30 percent by volume of porosity.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by volume percent (vol. %.) based on a total volume of the composition unless otherwise indicated.

The present disclosure is directed to a multilayer environmental barrier coating with an outer layer that may contain a fine scale porosity and may resist vaporization in the presence of high-velocity steam. The fine scale porosity may be tailored to impart limited gas permeability while maintaining a reduced stiffness. The fine scale porosity may be maintained for long durations at high temperature through the presence of sintering resistant phases. For purposes of discussion herein, fine scale porosity means the characteristic length of the pore size, i.e., porosity, is on the order of the mean-free path of the gas species in contact with the coating, where the mean-free path is defined by the kinetic theory of gases. In addition, the mean-free path is inversely proportional to the gas pressure and proportional to the square root of the temperature. In turn, the fine scale porosity decreases the stiffness of the material. Consequently, as mentioned above, the fine scale porosity may be tailored to impart limited gas permeability while maintaining a reduced stiffness.

Figure 1:
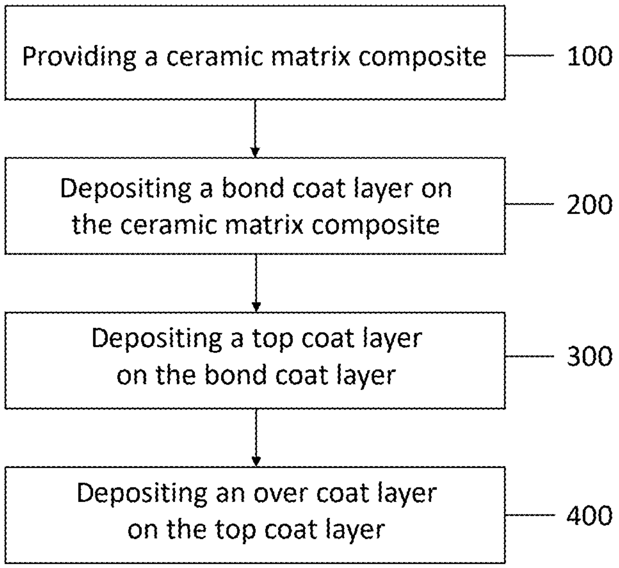
FIG. 1 is a flowchart illustrating an exemplary method of fabricating a multilayer environmental barrier coating.

Referring now to FIG. 1, a flowchart illustrating an exemplary method of fabricating a multilayer environmental barrier coating is shown. At an exemplary step 100, a ceramic matrix composite ("CMC") material 500 may be provided (see FIG. 5). In at least one embodiment, a CMC material 500 may comprise one or more ceramic reinforcement plies disposed in a ceramic matrix. Suitable ceramic matrices may include a silicon-containing ceramic, such as but not limited to, a silicon carbide (SiC) matrix or a silicon nitride ($Si_3N_4$) matrix. Exemplary ceramic reinforcement of the CMC material 500 may include silicon-containing ceramic fibers, such as but not limited to, SiC fibers or $Si_3N_4$ fibers. The CMC material 500 may include, but is not limited to, a SiC/SiC CMC in which the SiC fiber plies may be disposed within a SiC matrix. An exemplary fiber ply may have a fiber architecture, which refers to an ordered arrangement of the fiber tows relative to one another, such as a two-dimensional (2D) woven ply or a three-dimensional (3D) structure. In at least one alternative embodiment, a monolithic ceramic may not contain either fibers or reinforcements, and may be formed of a single material. Suitable monolithic ceramics may include silicon-containing ceramics, such as SiC or $Si_3N_4$.

Figure 5:
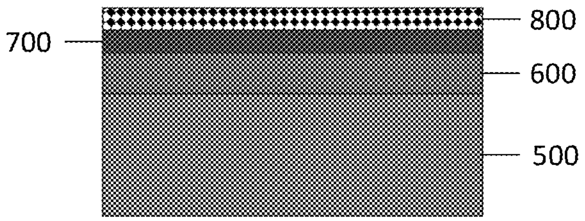
FIG. 5 is an illustration depicting an exemplary embodiment of an exemplary multilayer environmental barrier coating.

Next, at an exemplary step 200 of FIG. 1, a bond coat layer 600 may be deposited on the ceramic matrix composite (see FIG. 5). In at least one embodiment, the bond coat layer 600 may comprise one or more of the following: a matrix including at least one of hafnium silicate and silicon oxide; silicon carbide; and, an alkaline earth alumino-silicate glass additive, e.g., barium-magnesium-aluminum-silicate (BMAS), calcium-aluminum-silicate (CAS), combinations thereof, and the like. The deposited bond coat layer 600 may exhibit and possess a thickness of approximately 50μm to approximately 500μm. Next, at an exemplary step 300 of FIG. 1, a top coat layer 700 may be deposited on the bond coat layer 600 (see FIG. 5). The top coat layer 700 may be deposited on a surface adjacent the bond coat layer 600 and opposite the CMC material 500. In at least one embodiment, the top coat layer 700 may include, but is not limited to, hafnium silicate, hafnium oxide, zirconium silicate, yttrium disilicate, yttrium monosilicate, ytterbium disilicate, ytterbium mono silicate, the mono and disilicates of other rare earth oxides, combinations thereof, and the like. In at least one embodiment, the top coat layer 700 may have a thickness of approximately 1 mil to approximately 10 mil.

Next, at an exemplary step 400 of FIG. 1, an exemplary over coat layer 800 may be deposited on the top coat layer 700 (see FIG. 5). The exemplary over coat layer 800 may be deposited on a surface adjacent the top coat layer 700 and opposite the bond coat layer 600. The exemplary over coat layer 800 may exhibit and possess a porosity of no more than 50 percent by volume of the layer 800. The exemplary over coat layer 800 may include, but is not limited to, at least three embodiments; each embodiment fabricated using a different variation of step 400.

Figure 2:
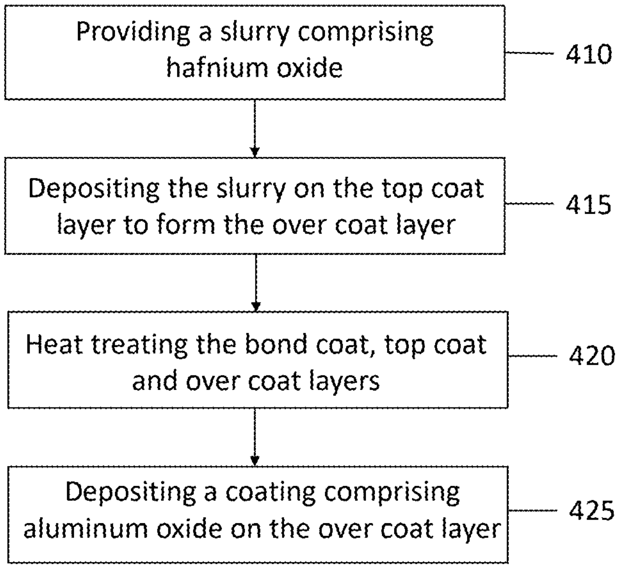
FIG. 2 is a flowchart illustrating an exemplary embodiment of a step of depositing an exemplary over coat layer.

Referring now to FIGS. 2 and 5, in at least one embodiment, a slurry comprising hafnium oxide particles may be provided at an exemplary step 410 (see FIG. 2). In at least one embodiment, the slurry may also include a solvent, along with additives, water-based binders, e.g., acrylic binder, adjuvants, viscosity modifiers, dispersants, surfactants, combinations thereof, and the like. In addition to hafnium oxide, other suitable metal particles may include, but are not limited to, fully stabilized $HfO_2$, fully stabilized zirconia, $TiO_2$, $HfTiO_4$, $Al_2TiO_5$, rare earth (Y, Yb, Sc, Lu, and the like) monosilicates, mullite, combinations thereof, and the like. In at least one embodiment, the metal oxide particle concentration of the slurry may be approximately 20 percent by volume to approximately 50 percent by volume of the slurry, and preferably approximately 20 percent by volume to approximately 40 percent by volume of the slurry. The suitable metal oxide particle material may exhibit and possess resistance to steam, while the suitable coating material may restrict the grain size of the suitable metal particle material. Next, at an exemplary step 415 of FIG. 2, the slurry may be deposited on the top coat layer 700 to form the over coat layer 800 (see also FIG. 5). Next, at an exemplary step 420, the bond coat layer 600, top coat layer 700, and over coat layer 800 may undergo heat treatment at a temperature of approximately 500° C. to approximately 1,600° C. for a time period of approximately 10 minutes to approximately 24 hours, and preferably at a temperature of approximately 900° C. to approximately 1,200° C. for a time period of approximately 30 minutes to approximately 4 hours. The heat treatment step may consolidate, without densifying, the structure of the over coat layer 800. By consolidating the structure of the over coat layer 800, a desired porosity, and pore size too, of the surface of the over coat layer 800 may be achieved. Lastly, at an exemplary step 425 of FIG. 2, a coating of aluminum oxide may be deposited on the over coat layer 800. In addition to aluminum oxide, other suitable coating materials may include, but are not limited to, rare earth silicates, mullite, combinations thereof, and the like. In at least one embodiment, an aluminum oxide coating material may be paired with either hafnium oxide particles or zirconium oxide particles. In contrast, rare earth silicate and mullite coating materials may be paired with hafnium oxide particles. When utilizing any one or more of the aforementioned coating materials, the coating material permeates the over coat layer 800 and coats each hafnium oxide particle, zirconium oxide particle, combinations thereof, and the like, contained therein (see also FIG. 5). To achieve this desired result, the aluminum oxide coating may be deposited using a suitable technique such as, but not limited to, atomic layer deposition, chemical vapor phase deposition, combinations thereof, and the like. In addition, or in the alternative, slurry and sol-gel deposition techniques may also be suitable for use herein so long as the techniques are modified to achieve the intended coating thickness range(s) disclosed herein. In at least one embodiment, the coating material, e.g., aluminum oxide coating, may exhibit and possess a thickness sufficient to inhibit dewetting. Suitable thickness ranges may be, but are not limited to, approximately 10 nm to approximately 1000 nm, preferably approximately 50 nm to approximately 500 nm, and most preferably approximately 100 nm. The aforementioned coating deposition technique may prevent the existing pores and porosity of the surface of the over coat layer 800 from shrinking in size, thus retaining and maintaining the desired pore size and porosity. In at least one embodiment, the resultant over coat layer 800 may be an immiscible aluminum oxide coated hafnium oxide coating that may exhibit a porosity of no more than approximately 50 percent by volume of the layer 800, preferably approximately 20 percent by volume to 30 percent by volume of the layer 800, and most preferably approximately 25 percent by volume to 30 percent by volume of the layer 800. In at least one other embodiment, the resultant over coat layer 800 may exhibit and possess a total thickness of approximately 4 mil to approximately 10 mil.

Figure 3:
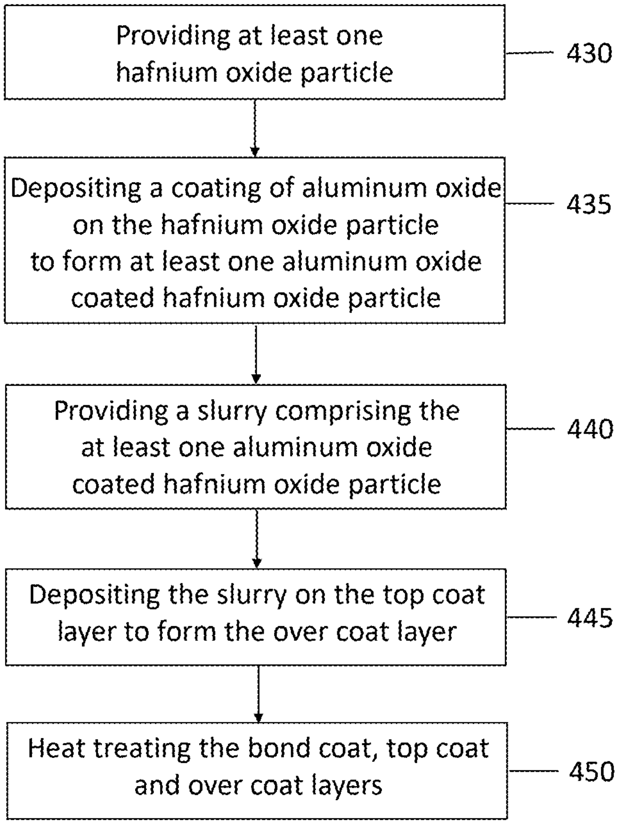
FIG. 3 is a flowchart illustrating another exemplary embodiment of a step of depositing an exemplary over coat layer.
Figure 6:
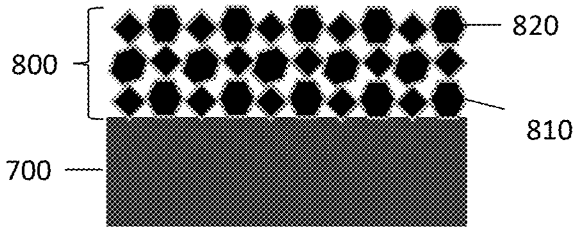
FIG. 6 is an illustration depicting another exemplary embodiment of another exemplary multilayer environmental barrier coating.

Referring now to FIGS. 3 and 6, in another embodiment, at least one hafnium oxide particle may be provided at an exemplary step 430 (see FIG. 3). In addition to hafnium oxide, other suitable metal particles may include, but are not limited to, fully stabilized $HfO_2$, fully stabilized zirconia, $TiO_2$, $HfTiO_4$, $Al_2TiO_5$, rare earth (Y, Yb, Sc, Lu, and the like) monosilicates, mullite, combinations thereof, and the like. Next, at an exemplary step 435 of FIG. 3, a coating of aluminum oxide 810 may be deposited on an exterior surface on the at least one hafnium oxide particle 820 to form at least one aluminum oxide coated hafnium oxide. In at least one embodiment, the aluminum oxide coats up to 100% of an exterior surface of each hafnium oxide particle (see also FIG. 6). To achieve this desired result, the aluminum oxide coating may be deposited using a suitable technique such as, but not limited to, atomic layer deposition, chemical vapor phase deposition, combinations thereof, and the like. In addition, or in the alternative, slurry and sol-gel deposition techniques may also be suitable for use herein so long as the techniques are modified to achieve the intended coating thickness range(s) disclosed herein. In at least one embodiment, the resultant coating material, e.g., aluminum oxide coating may exhibit and possess a thickness of approximately 2 nm to approximately 50 nm, and preferably approximately 10 nm. Next, at an exemplary step 440 of FIG. 3, the at least one aluminum oxide coated hafnium oxide particle may be added to a solvent, along with additives, water-based binders, e.g., acrylic binder, adjuvants, viscosity modifiers, dispersants, surfactants, combinations thereof, and the like, to form a slurry. For instance, suitable solvents may include, but are not limited to, water; alcohols, such as ethanol, isopropanol, and the like; combinations thereof, and the like. Next, at an exemplary step 445 of FIG. 3, the slurry containing aluminum oxide coated hafnium oxide particles may be deposited on the top coat layer 700 to form the over coat layer 800 (see FIG. 6). In at least one embodiment, the metal oxide particle concentration of the slurry may be approximately 20 percent by volume to approximately 50 percent by volume of the slurry, and preferably approximately 20 percent by volume to approximately 40 percent by volume of the slurry. The suitable metal oxide particle material may exhibit and possess resistance to steam, while the suitable coating material may restrict the grain size of the suitable metal particle material. Lastly, at an exemplary step 450 of FIG. 3, the bond coat layer 600, top coat layer 700, and over coat layer 800 may undergo heat treatment at a temperature of approximately 500° C. to approximately 1,600° C. for a time period of approximately 10 minutes to approximately 24 hours, and preferably at a temperature of approximately 900° C. to approximately 1,200° C. for a time period of approximately 30 minutes to approximately 4 hours. The heat treatment step may consolidate, without densifying, the structure of the over coat layer 800. By consolidating the structure of the over coat layer 800, a desired porosity, and pore size too, of the surface of the over coat layer 800 may be achieved. In at least one embodiment, the resultant over coat layer 800 may contain an immiscible aluminum oxide coated hafnium oxide particle coating that may exhibit and possess a total thickness of approximately 0.5 mil to approximately 5 mil, and preferably approximately 1 mil. In at least one other embodiment, the resultant over coat layer 800 may exhibit and possess a porosity of no more than approximately 50 percent by volume of the layer 800, preferably approximately 20 percent by volume to 30 percent by volume of the layer 800, and most preferably approximately 25 percent by volume to 30 percent by volume of the layer 800.

Figure 4:
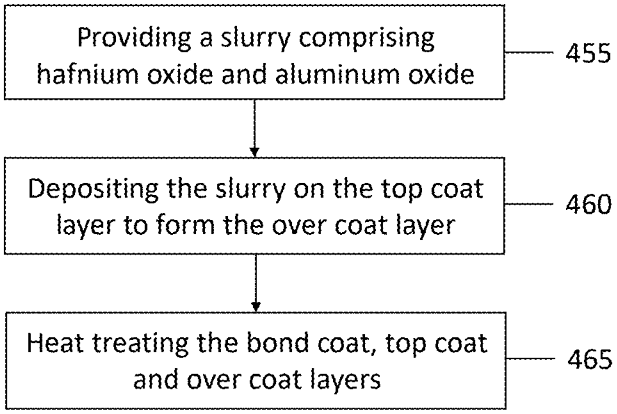
FIG. 4 is a flowchart illustrating yet another exemplary embodiment of a step of depositing an exemplary over coat layer.
Figure 7:
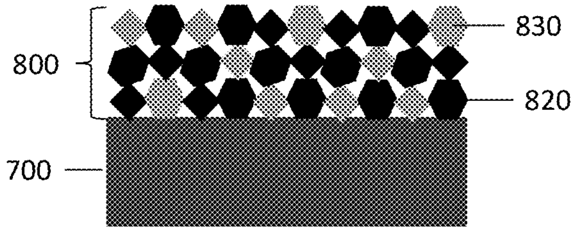
FIG. 7 is an illustration depicting yet another exemplary embodiment of yet another exemplary multilayer environmental barrier coating.

Referring now to FIGS. 4 and 7, in yet another embodiment, a slurry containing hafnium oxide, aluminum oxide, combinations thereof, and the like, may be provided at an exemplary step 455 (see FIG. 4). In addition to hafnium oxide and/or aluminum oxide, other suitable metal particles may include, but are not limited to, fully stabilized $HfO_2$, fully stabilized zirconia, $TiO_2$, $HfTiO_4$, $Al_2TiO_5$, rare earth (Y, Yb, Sc, Lu, and the like) monosilicates, mullite, combinations thereof, and the like. In at least one embodiment, the metal oxide particle concentration of the slurry may be approximately 20 percent by volume to approximately 50 percent by volume of the slurry, and preferably approximately 20 percent by volume to approximately 40 percent by volume of the slurry. The suitable metal particle material may exhibit and possess resistance to steam, while the suitable coating material may restrict the grain size of the suitable metal particle material. Next, at an exemplary step 460 of FIG. 4, the resultant slurry may be deposited on the top coat layer 700 to form the over coat layer 800 (see FIG. 7). Lastly, at an exemplary step 465 of FIG. 4, the bond coat layer 600, top coat layer 700, and over coat layer 800 may undergo heat treatment at a temperature of approximately 500° C. to approximately 1,600° C. for a time period of approximately 10 minutes to approximately 24 hours, and preferably at a temperature of approximately 900° C. to approximately 1,200° C. for a time period of approximately 30 minutes to approximately 4 hours. The heat treatment step may consolidate, without densifying, the structure of the over coat layer 800. By consolidating the structure of the over coat layer 800, a desired porosity, and pore size too, of the surface of the over coat layer 800 may be achieved. In at least one embodiment, the resultant over coat layer 800 may contain an immiscible aluminum oxide and hafnium oxide coating containing both hafnium oxide particles 820 and aluminum oxide particles 830. The over coat layer 800 may exhibit and possess a total thickness of approximately 0.5 mil to approximately 5 mil, and preferably approximately 1 mil. In at least one other embodiment, the resultant over coat layer 800 may exhibit and possess a porosity of no more than approximately 50 percent by volume of the layer 800, preferably approximately 20 percent by volume to 30 percent by volume of the layer 800, and most preferably approximately 25 percent by volume to 30 percent by volume of the layer 800.

In all the aforementioned embodiments, the resultant multilayer environmental barrier coating exhibits and possesses a porosity that influences the rate of recession by controlling the water vapor diffusion through the porous over coat layer 800. In addition, the thickness of the over coat layer 800 and size of the porosity also influence the water vapor diffusivity. In at least one embodiment, the resultant average heat-treated pore size of the porous over coat layer 800 may be less than approximately 5 μm, preferably less than 1 μm, and most preferably approximately 0.2 μm.

Figure 8:
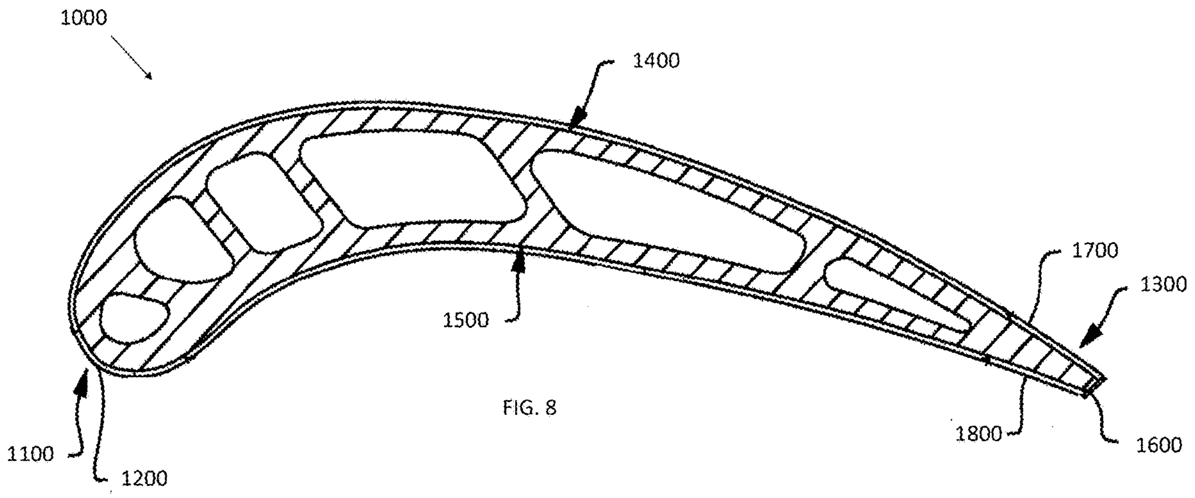
FIG. 8 is an illustration depicting a gas turbine engine component having an exemplary multilayer environmental barrier coating deposited thereupon.

When carrying out any one of the aforementioned exemplary embodiments of FIGS. 1-4, the resultant multilayer environmental barrier coated CMC material may be a multilayer environmental barrier coated gas turbine engine component for use in a gas turbine engine. Referring now to FIG. 8, an airfoil 1000 may include an airfoil wall that defines a leading end 1100, including an apex 1200, a trailing end 1300, and suction and pressure sides 1400, 1500 that join the leading end 1100 and the trailing end 1300, and an edge 1600. More particularly, the airfoil 1000 may include an (outer) airfoil wall that delimits the aerodynamic profile of the airfoil 1000. The wall may define the leading end 1100, the trailing end 1300, and both the suction and pressure sides 1400, 1500 that join the leading end 1100 and the trailing end 1300. In at least one embodiment, the exemplary multilayer environmental barrier coating disclosed herein may be disposed on the exterior of the (outer) airfoil wall in order to enhance the thermal resistance there. In at least one other embodiment, the exemplary multilayer environmental barrier coating disclosed herein may be disposed at an area 1700 on the suction side 1400 of the trailing end 1300 proximate to the edge 1600. In at least yet one other embodiment, the exemplary multilayer environmental barrier coating disclosed herein may be disposed at an area 1800 on the pressure side 1500 of the trailing end 1300 proximate to the edge 1600. However, various additional embodiments are conceivable such that the exemplary multilayer environmental barrier coating may be deposited elsewhere on the airfoil. In addition, other gas turbine engine components, beyond those possessing an airfoil, may benefit from the use and application of the exemplary multilayer environmental barrier coating disclosed herein.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A method of forming a multilayer environmental barrier coating, comprising:

providing a ceramic matrix composite;

depositing a bond coat layer on the ceramic matrix composite;

depositing a top coat layer on the bond coat layer;

depositing an over coat layer on the top coat layer, wherein the over coat layer includes no more than approximately 50 percent by volume of porosity, wherein depositing the over coat layer includes the steps of:

providing at least one of the following particles: $HfO_2$, fully stabilized $HfO_2$, fully stabilized zirconia, $TiO_2$, $HfTiO_4$, $Al_2TiO_5$, rare earth monosilicates, mullite, and combinations thereof;

depositing on an exterior surface of the at least one particle a coating comprising one or more of the following coating materials: aluminum oxide, rare earth silicates, mullite, and combinations thereof, to form at least one coated particle;

providing a slurry comprising the at least one coated particle;

depositing the slurry on the top coat layer to form the over coat layer; and heat treating the bond coat layer, the top coat layer and the over coat layer to form at least one pore on a surface of the over coat layer and create at least one porous surface of the over coat layer.

2. The method of claim 1, further comprising the steps of:

depositing on the at least one porous surface of the over coat layer a coating comprising one or more of the following coating materials: aluminum oxide, rare earth silicates, mullite, and combinations thereof, wherein depositing the coating comprises at least one of the following deposition methods: atomic layer deposition, chemical vapor deposition, sol-gel, slurry, and combinations thereof.

3. The method of claim 2, wherein the coating includes a thickness of approximately 10 nm to approximately 1000 nm.

4. The method of claim 2, wherein the heat treatment step further comprises heating the bond coat layer, the top coat layer and the over coat layer at a temperature of approximately 500° C. to approximately 1,600° C. for a time period of approximately 10 minutes to approximately 24 hours.

5. The method of claim 1, wherein depositing the coating comprises at least one of the following deposition methods: atomic layer deposition, chemical vapor deposition, sol-gel, slurry, and combinations thereof.

6. The method of claim 5, wherein the heat treatment step further comprises heating the bond coat layer, the top coat layer and the over coat layer at a temperature of approximately 500° C. to approximately 1,600° C. for a time period of approximately 10 minutes to approximately 24 hours.

7. The method of claim 5, wherein the coating includes a thickness of approximately 2 nm to approximately 50 nm.

8. The method of claim 1, wherein the slurry further comprises at least one of the following second particles: aluminum oxide, rare earth silicates, mullite, and combinations thereof.

9. The method of claim 8, wherein the heat treatment step further comprises heating the bond coat layer, the top coat layer and the over coat layer at a temperature of approximately 500° C. to approximately 1,600° C. for a time period of approximately 10 minutes to approximately 24 hours.

10. The method of claim 1, wherein the over coat layer includes a thickness of approximately 0.5 mil to approximately 5 mil.

11. The method of claim 1, wherein the over coat layer includes approximately 20 percent by volume to approximately 30 percent by volume of porosity.

* * * * *